United States Patent [19]
Kato

[11] Patent Number: 6,104,532
[45] Date of Patent: Aug. 15, 2000

[54] REAL IMAGE MODE VARIABLE MAGNIFICATION FINDER OPTICAL SYSTEM

[75] Inventor: Shigeru Kato, Tachikawa, Japan

[73] Assignee: Olympus Optical Co., Ltd., Tokyo, Japan

[21] Appl. No.: 09/132,407

[22] Filed: Aug. 11, 1998

Related U.S. Application Data

[62] Division of application No. 08/523,504, Sep. 1, 1995, Pat. No. 5,796,518.

[30] Foreign Application Priority Data

Sep. 5, 1994 [JP] Japan .................................. 6-210992

[51] Int. Cl.[7] .......................... G02B 23/00; G03B 13/02
[52] U.S. Cl. ......................... 359/432; 359/422; 359/431; 396/380
[58] Field of Search .......................... 359/362, 421–423, 359/431–433, 676, 738–740; 396/373–386

[56] References Cited

U.S. PATENT DOCUMENTS

| | | | |
|---|---|---|---|
| 4,545,655 | 10/1985 | Fantone et al. ........................ | 359/399 |
| 4,571,031 | 2/1986 | Kato ....................................... | 350/426 |
| 5,105,311 | 4/1992 | Tokumaru et al. .................... | 359/686 |
| 5,153,777 | 10/1992 | Okada et al. ........................... | 359/739 |
| 5,173,806 | 12/1992 | Ogata ..................................... | 359/683 |
| 5,191,477 | 3/1993 | Abe et al. .............................. | 359/695 |
| 5,218,477 | 6/1993 | Ito ......................................... | 359/689 |
| 5,231,534 | 7/1993 | Kato ....................................... | 359/432 |
| 5,309,286 | 5/1994 | Abe et al. .............................. | 359/695 |
| 5,323,264 | 6/1994 | Kato ....................................... | 359/432 |
| 5,448,411 | 9/1995 | Morooka ................................ | 359/676 |

OTHER PUBLICATIONS

English Abstracts of Japanese Reference No. 5–346610.
English Abstracts of Japanese Reference No. 3–4217.
English Abstracts of Japanese Reference No. 5–53054.

*Primary Examiner*—Thong Nguyen
*Attorney, Agent, or Firm*—Pillsbury Madison & Sutro LLP

[57] ABSTRACT

A real image mode variable magnification finder optical system is provided with an objective system having a positive refracting power, a correctly erect image forming system having a plurality of reflecting members for converting an intermediate image formed by the objective system into a correctly erect image, and an eyepiece system having a positive refracting power. The objective system includes a first lens unit having a negative refracting power, a second lens unit having a positive refracting power, and a third lens unit having a negative refracting power. At least one of the light reflecting members is arranged between the third lens unit and a position of said intermediate image, and the first, second and third lens units are adapted to be moved along the optical axis when magnification of the optical system is to be changed. Thus, the finder optical system enables one to change magnification thereof with high ratios and to form a good image of visual field with decreased flare.

5 Claims, 11 Drawing Sheets

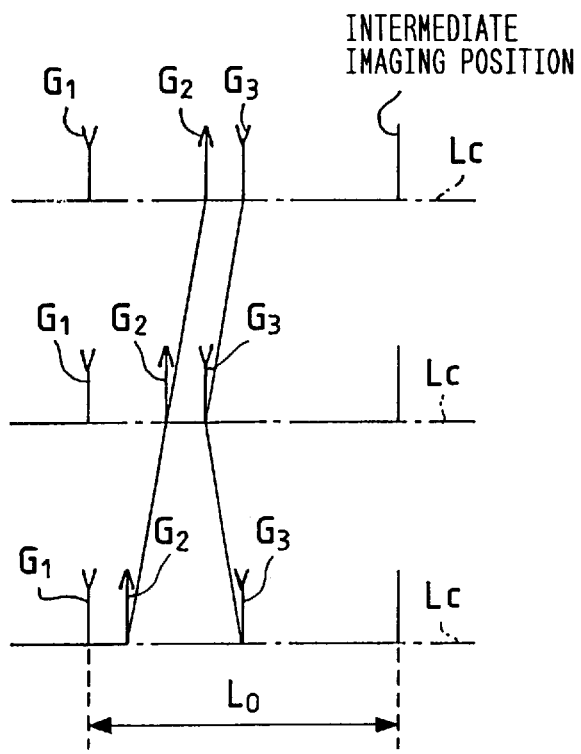
FIG. 1A PRIOR ART
FIG. 1B PRIOR ART
FIG. 1C PRIOR ART
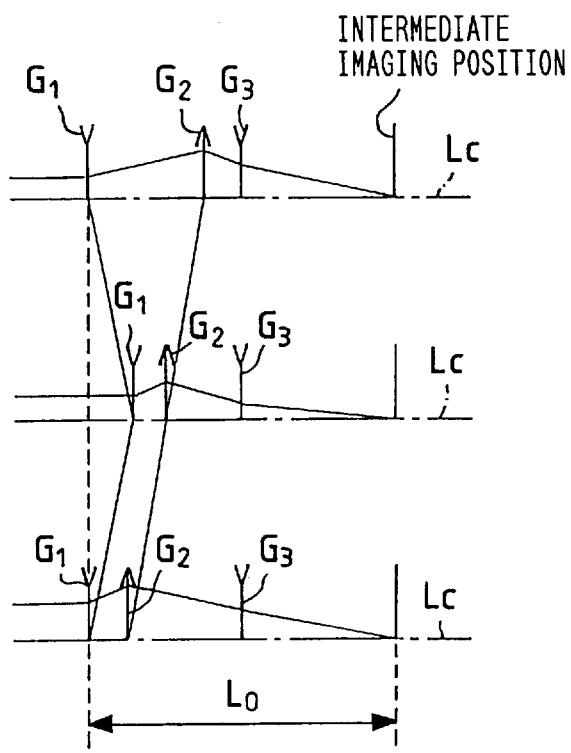
FIG. 2A PRIOR ART
FIG. 2B PRIOR ART
FIG. 2C PRIOR ART SPHERICAL ABERRATION
D = 2.0mm

ASTIGMATISM
ω = 29.7°

DISTORTION
ω = 29.7°

SPHERICAL ABERRATION
D = 2.0mm

ASTIGMATISM
ω = 14.6°

DISTORTION
ω = 14.6°

SPHERICAL ABERRATION
D = 2.0mm

ASTIGMATISM
ω = 9.6°

DISTORTION
ω = 9.6°

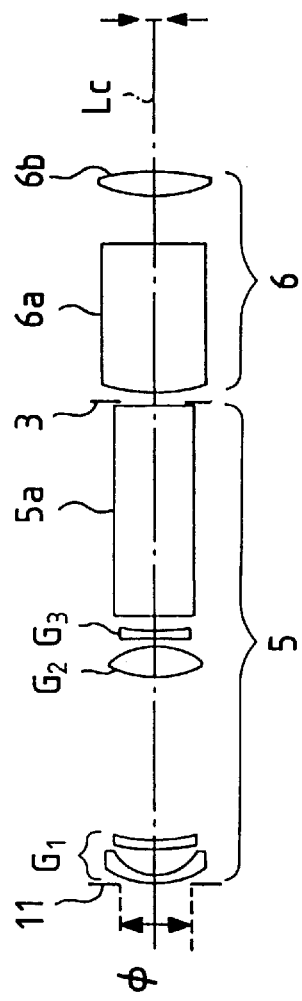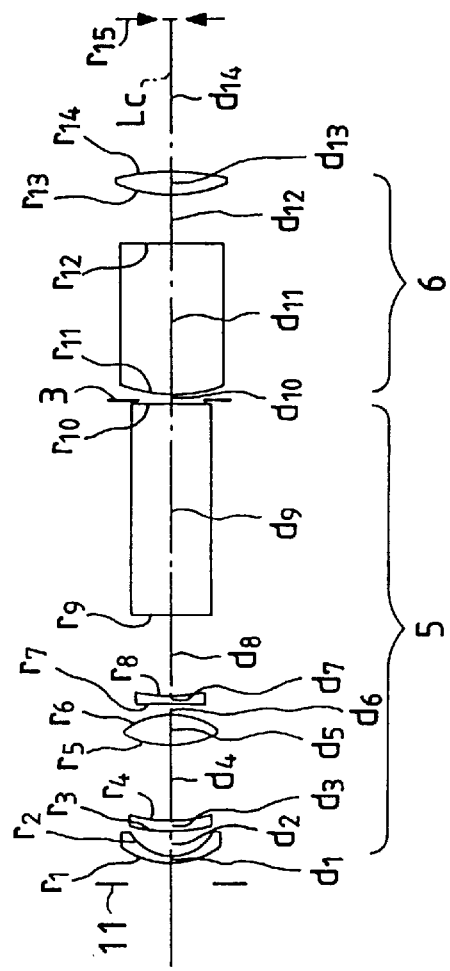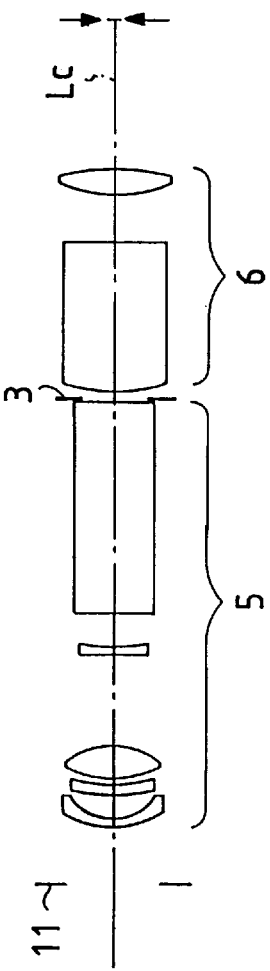
FIG. 11A
FIG. 11B
FIG. 11C

SPHERICAL
ABERRATION
D = 2.0 mm

-2.00  2.00
(1/m)

ASTIGMATISM
ω = 28.1°

-2.00  2.00
(1/m)

DISTORTION
ω = 28.1°

-10.00  10.00
(%)

SPHERICAL
ABERRATION
D = 2.0 mm

-2.00  2.00
(1/m)

ASTIGMATISM
ω = 13.7°

-2.00  2.00
(1/m)

DISTORTION
ω = 13.7°

-10.00  10.00
(%)

SPHERICAL
ABERRATION
D = 2.0 mm

-2.00  2.00
(1/m)

ASTIGMATISM
ω = 6.7°

-2.00  2.00
(1/m)

DISTORTION
ω = 6.7°

-10.00  10.00
(%)

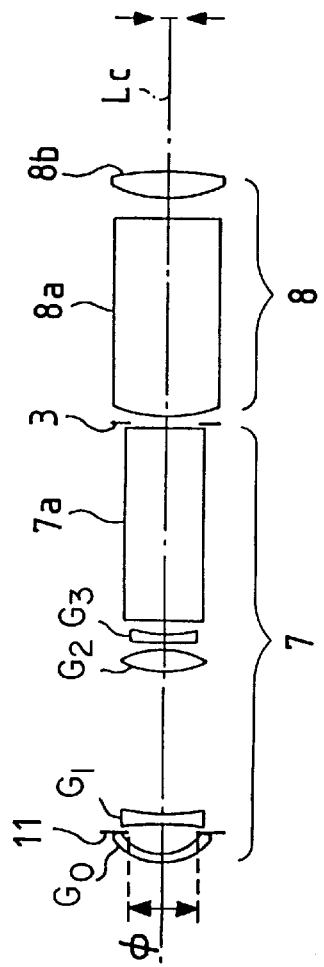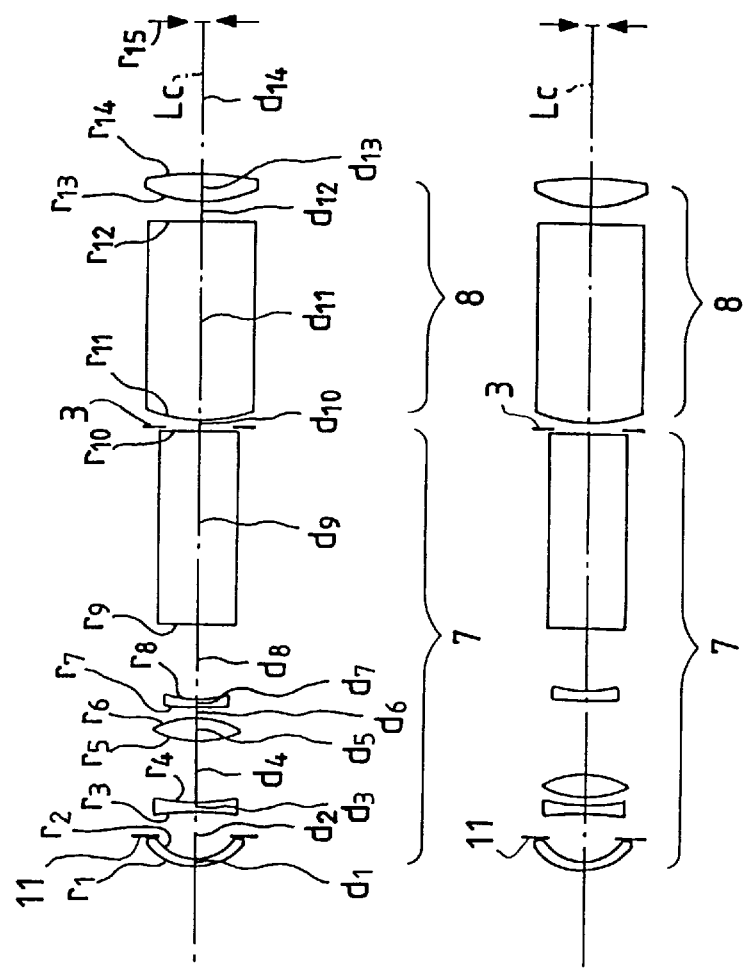
FIG. 15A  FIG. 15B  FIG. 15C

SPHERICAL
ABERRATION
D = 2.0 mm

-2.00   2.00
(1/m)

ASTIGMATISM
ω = 27.4°

-2.00   2.00
(1/m)

DISTORTION
ω = 27.4°

-10.00   10.00
(%)

SPHERICAL
ABERRATION
D = 2.0 mm

-2.00   2.00
(1/m)

ASTIGMATISM
ω = 13.2°

-2.00   2.00
(1/m)

DISTORTION
ω = 13.2°

-10.00   10.00
(%)

SPHERICAL
ABERRATION
D = 2.0 mm

-2.00   2.00
(1/m)

ASTIGMATISM
ω = 6.5°

-2.00   2.00
(1/m)

DISTORTION
ω = 6.5°

-10.00   10.00
(%)

SPHERICAL ABERRATION
D = 2.0 mm

-2.00　　2.00
(1/m)

ASTIGMATISM
ω = 30.1°

-2.00　　2.00
(1/m)

DISTORTION
ω = 30.1°

-10.00　　10.00
(%)

SPHERICAL ABERRATION
D = 2.0 mm

-2.00　　2.00
(1/m)

ASTIGMATISM
ω = 16.3°

-2.00　　2.00
(1/m)

DISTORTION
ω = 16.3°

-10.00　　10.00
(%)

SPHERICAL ABERRATION
D = 2.0 mm

-2.00　　2.00
(1/m)

ASTIGMATISM
ω = 9.1°

-2.00　　2.00
(1/m)

DISTORTION
ω = 9.1°

-10.00　　10.00
(%)

REAL IMAGE MODE VARIABLE MAGNIFICATION FINDER OPTICAL SYSTEM

PRIOR APPLICATIONS

This is a division of application Ser. No. 08/523,504, filed Sep. 1, 1995, now U.S. Pat. No. 5,796,518 which claimed priority, as does this application, from Japanese Application No. 6-210992, filed in Japan on Sep. 5, 1994, the contents of both of which applications being incorporated hereinto by reference.

BACKGROUND OF THE INVENTION a) Field of the Invention

The present invention relates to a real image mode variable magnification finder optical system for use in photographic cameras, video cameras or the like.

b) Description of the Prior Art

Real image finder optical systems are well known as finder optical systems formed independently of photographing optical systems. The real image finder optical system can obtain a clear view of a field frame and a good image within the field frame. Recently, however, it is required to provide the finder with a smaller size and higher ratio of magnification change. In the real image finder optical system, an image erecting system is needed to convert an inverted image (an intermediate image) formed by an objective system into an erect image. In the case in which this image erecting system is constituted by a reflecting member such as a Porro prism or the like, it is known that the total length of the finder optical system can be made shorter by positioning an intermediate imaging position within the image erecting system. That is, generally, if one of four reflecting surfaces conventionally included in an eyepiece system is incorporated in an area of a back focus, the total length of the finder optical system will be able to be shortened. Specifically, if two or more reflecting surfaces are incorporated in the objective system, it is known that the optical performance of the eyepiece system can be well maintained, because the distance between the intermediate imaging position and the eyepiece system can be shortened. Accordingly, an objective system which can assure a long back focus has been in recent demand. For example, objective systems comprising a first lens unit with a negative refracting power, a second lens unit with a positive refracting power and a third lens unit with a negative refracting power are disclosed in Japanese Patent Preliminary Publication Nos. Hei 3-4217 and Hei 5-53054, respectively. These are conventionally known objective systems, each having a long back focus and by which a variable magnification ratio of the order of three times is obtained.

Japanese Patent Preliminary Publication No. Hei 3-4217 discloses a finder optical system also including a magnification changing operation mechanism, which is made small by moving only a second and third lens units each having a relatively small lens diameter. As shown in FIGS. 1A, 1B and 1C, this optical system is composed of a first lens unit $G_1$, a second lens unit $G_2$ and a third lens unit $G_3$. When the magnification is made larger, the second lens unit $G_2$ is shifted to the object side (the left side in the drawings) along the optical axis and a change of diopter by this change of magnification level is corrected by shifting the third lens unit $G_3$ along the optical axis. In this system, the third lens unit $G_3$ is adapted to be shifted to the object side when magnification of the finder optical system is changed from a wide position to a middle position thereof and is adapted to be moved to the eyepiece system side (the right side in the drawings) when magnification is to be changed from the middle position to a telephoto position thereof. The total length $L_0$ of the objective system is constant.

Further, in the optical system disclosed in Japanese Patent Preliminary Publication No. Hei 5-53054, a first lens unit $G_1$ and a second lens unit $G_2$ are adapted to be moved respectively along the optical axis when magnification of the finder optical system is to be changed between a wide position, a middle position and a telephoto position thereof, as shown in FIGS. 2A, 2B and 2C. This finder optical system is intended to provide a telephoto type optical system which is shortened in its total length by using the above-mentioned two lens units for varying magnification having a positive refracting power in combination and a third lens unit $G_3$ having a negative refracting power. Variation of magnification for the telephoto position is performed by shifting the second lens unit $G_2$ toward the object side (the left side in the drawings), and a change of diopter by the variation of magnification is corrected by moving the first lens unit $G_1$. The first lens unit $G_1$ is shifted toward the eyepiece system side along the optical axis when magnification is to be changed from the wide position to the middle position thereof and is shifted toward the object side along the optical axis when magnification is to be changed from the middle position to the telephoto position thereof. Accordingly, the total length of the finder optical system becomes shortest at the middle position of the variation of magnification and becomes equal approximately at the wide position and the telephoto position thereof. Thus, a small sized objective system as a whole can be provided.

However, the optical system disclosed in Japanese Patent Preliminary Publication No. Hei 3-4217 has relatively high manufacturing cost and is large because it comprises many lens elements and the objective system portion occupies, in the optical system, considerable space. On the other hand, the optical system disclosed in Japanese Patent Preliminary Publication No. Hei 5-53054 can be made such that it is small. However, if one tries to obtain a higher magnification ratio change in this small optical system, a large amount of variation in aberrations of the optical system will occur when magnification of the optical system is changed, and, as a result, one will not obtain a good image of the field of view.

Further, examples of finder optical systems that include variable magnification objective systems consisting of a first lens unit with a negative refracting power, a second lens unit with a positive refracting power and a third lens unit with a negative refracting power are disclosed in Japanese Patent Preliminary Publication Nos. Hei 3-233420, Hei 4-230719 and Hei 5-346610, respectively. As each of these objective systems is so formed as to have a short back focus, two or more reflecting members can not be arranged in the area having the back focus.

Furthermore, at the telephoto position of the finder optical system, in which a field angle thereof becomes narrow, flare may occur by injurious light rays which enter into the finder optical system from outside of the field of view. As is well known, it is preferable to arrange a light interrupting member before the objective system in order to obtain a good image of visual field without flare. However, in the prior finder optical systems as described above, as the total length of the finder optical system is approximately the same at the wide position (FIG. 3A) and the telephoto position (FIG. 3B) thereof as shown in FIGS. 3A and 3B, if the light interrupting member 20 is disposed to fit the finder optical system in the telephoto position, a part of the visual field will be cut off when the finder optical system is adjusted to the wide position. To the contrary, if the light interrupting member 20 is disposed to fit the finder optical system in the wide position, a good image of visual field will be spoiled due to insufficient removal of injurious light rays when the finder optical system is adjusted to the telephoto position.

SUMMARY OF THE INVENTION

Therefore, an object of the present invention is to provide a real image mode variable magnification finder optical system by which a wide range of magnification variation can be obtained, irrespective of small size.

Another object of the present invention is to provide a real image mode variable magnification finder optical system having a high performance by which a good image of visual field can be obtained without the occurrence of flare.

In order to attain the above-mentioned objects, the real image mode variable finder optical system according to the present invention is provided with, in the order from the object side, an objective system with a positive refracting power, a correctly erect image forming system with a plurality of reflecting members for converting an intermediate image formed by the objective system into a correctly erect image, and an eyepiece lens system with a positive refracting power. The objective system comprises a first lens unit having a negative refracting power, a second lens unit having a positive refracting power, and a third lens unit having a negative refracting power, at least one of the reflecting members in the correctly erect image forming system being arranged between the third lens unit and the position of the intermediate image, and each of the lens units being adapted to be shifted along the optical axis when magnification of the finder optical system is to be varied.

Further, according to the present invention, the objective lens system comprises a first lens unit, a second lens unit having a negative refracting power, a third lens unit having a positive refracting power, and a fourth lens unit having a negative refracting power, at least one of the reflecting members in the correctly erect image forming system being arranged between the fourth lens unit and the position of the intermediate image, and at least the second, third and fourth lens units being adapted to be shifted along the optical axis when magnification of the finder optical system is to be varied.

Furthermore, according to the present invention, a light interrupting member is arranged on the object side of the most object side lens unit among those adapted to be shifted along the optical axis for varying magnification, and the finder optical system is adapted to satisfy at least one of the conditions $$D_T > D_W \tag{1}$$

$$\phi_W > \phi_T \tag{2}$$

where $D_W$ is a distance on the optical axis, in the wide position of the finder optical system, between the light interrupting member and the most object side movable lens unit for varying magnification, $D_T$ is a distance on the optical axis, in the telephoto position of the finder optical system, between the light interrupting member and the most object side movable lens unit for varying magnification, $\phi_W$ is the diameter of an aperture, on the optical axis, of the light interrupting member in the wide position of the finder optical system and $\phi_T$ is the diameter of the aperture of the light interrupting member in the telephoto position of the finder optical system.

These and other objects as well as the features and advantages of the present invention will become apparent from the following detailed description of the preferred embodiments when taken in conjunction with the accompanying drawings.

BRIEF DESCRIPTION OF THE DRAWINGS

FIG. 1A, FIG. 1B and FIG. 1C are diagrams respectively illustrating an arrangement of respective lens units in wide, middle and telephoto positions of an example of conventional real image mode variable magnification finder optical system;

FIG. 2A, FIG. 2B and FIG. 2C are diagrams respectively illustrating an arrangement of respective lens units in wide, middle and telephoto positions of another example of conventional real image mode variable magnification finder optical system;

FIG. 11A, FIG. 11B and FIG. 11C show development diagrams of optical paths at a wide position, a middle position and a telephoto position of a second embodiment of the real image mode variable magnification finder optical system according to the present invention;

FIG. 15A, FIG. 15B and FIG. 15C show development diagrams of optical paths at a wide position, a middle position and a telephoto position of a third embodiment of the real image mode variable magnification finder optical system according to the present invention;

DETAILED DESCRIPTION OF THE PREFERRED EMBODIMENTS

Figure 3A:
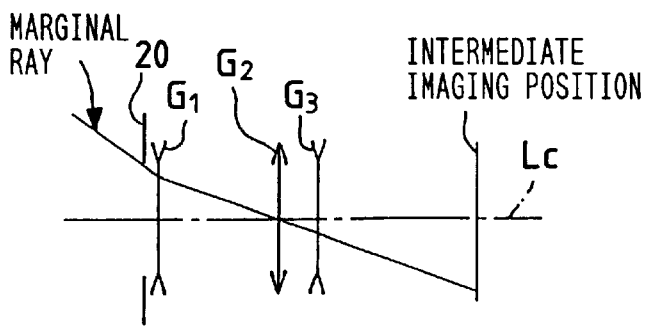
FIG. 3A and FIG. 3B are explanatory views respectively illustrating the state of an incident ray entering into the optical system in the wide and telephoto positions of a conventional real image mode variable magnification finder optical system including therein a flare stop (a light interrupting member)
Figure 3B:
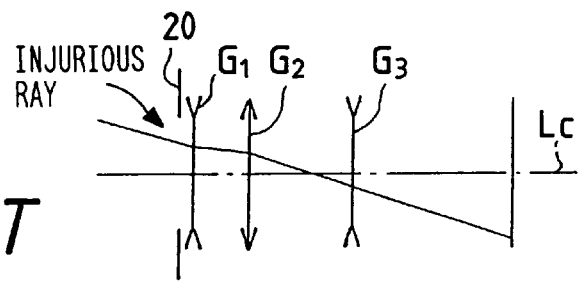
Figure 4A:
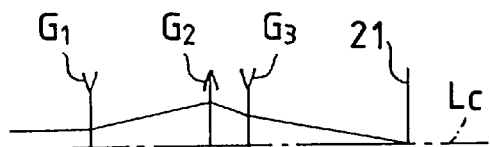
FIG. 4A, FIG. 4B and FIG. 4C are diagrams respectively illustrating an arrangement of respective lens units in wide, middle and telephoto positions of the real image mode variable magnification finder optical system according to the present invention.
Figure 4B:
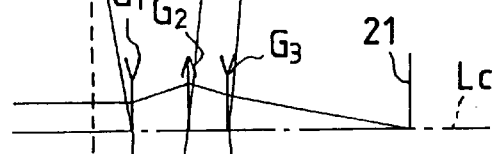
Figure 4C:
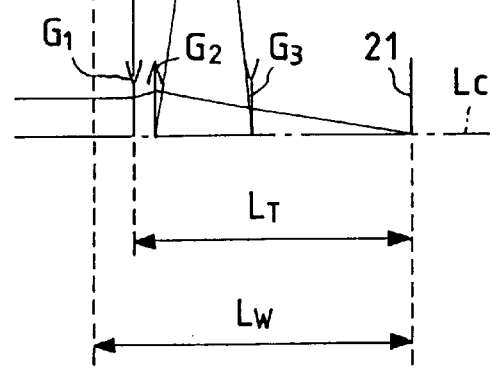

In the real image mode variable magnification finder optical system according to the present invention, as shown in FIGS. 4A, 4B and 4C, a change of magnification from the wide position thereof (a low magnification level FIG. 4A) to the telephoto position thereof (a high magnification level, FIG. 4C) is mainly carried out by moving the second lens unit $G_2$ of the objective system along the optic axis $L_C$ from the eyepiece system side (the right side in the drawings) toward the object side (the left side in the drawings). In this way, a shift of the intermediate imaging position 21 (a change of diopter) and a variation of aberration which occur in accordance with the change of magnification are corrected by moving the first lens unit $G_1$ and the third lens unit $G_3$ along the optic axis $L_C$. As described above, in the finder optical system according to the present invention, as three lens units are moved, the variation of aberrations, particularly, variation of curvature of field can be made adequately small in comparison with conventional finder optical systems, thus a higher variable magnification ratio, i.e. change of magnification in a wider range can be attained.

A change of magnification from the wide position to the intermediate position (FIG. 4B) of the finder optical system is obtained by moving the second lens unit $G_2$ and the third lens unit $G_3$ toward the object side, and a change of diopter is corrected by moving the first lens unit $G_1$ toward the eyepiece system side. Accordingly, in the wide position of the finder optical system, the space between the second lens unit $G_2$ and third lens unit $G_3$ can be minimized, and the object system can be formed so that a ratio of the length of movable range of the lens units to the total length $L_W$ of the objective system is small. Besides, as the second lens unit $G_2$ and the third lens unit $G_3$ are located close to each other, they can be regarded as one lens group having a positive refracting power, and thus, the objective system as a whole forms an optical system of retrofocus type comprising a lens group with a negative refracting power and another lens group with a positive refracting power. Accordingly, the objective system results in having a long back focus in which a reflecting member of the correctly erect image forming system can be disposed. Moreover, the space between the intermediate imaging position 21 and the eyepiece system can be made small, and good performance of the eyepiece lens system can be maintained.

In this case, it is preferable to satisfy the condition $$1.4 < D_3/L \qquad (3)$$

where $D_3$ is a minimum value of the space between a most image-side movable lens unit of the objective system and an intermediate imaging plane of the finder optical system according to the present invention and L is a diagonal length of a field frame disposed on the intermediate imaging plane.

Here, if the value of $D_3/L$ does not satisfy the condition (3), a reflecting member reflecting incident rays twice will not be able to be easily disposed in the finder optical system, and as the space between the side surface of a prism or a frame for supporting the prism and a bundle of incident rays becomes small, unfavorable phenomena such as ghosts will easily occur by reflecting rays from the side surface of the prism or frame.

In case a change of magnification from the intermediate position to the telephoto position of the finder optical system is performed, a change of diopter is mainly corrected by moving the third lens unit $G_3$ toward the eyepiece system side. Accordingly, the second lens unit $G_2$ becomes more distant from the third lens unit $G_3$ and closer to the first lens unit $G_1$. As a result, the first lens unit $G_1$ and the second lens unit $G_2$ as a whole can be regarded as one lens group having a positive refracting power, and the objective system as a whole becomes a telephoto type optical system comprising a lens group with a positive refracting power and another lens group with a negative refracting power. Thus, the total length of the objective system can be shortened, with the result that a small sized finder optical system as a whole can be obtained. Specifically, if the refracting power of the third lens unit $G_3$ is increased to emphasize telephoto type performance, the total length $L_T$ of the finder optical system in the telephoto position thereof can be made shorter than the total length $L_W$ in the wide position thereof. If the refracting power of the third lens unit $G_3$ is small, the total length of the objective system becomes long and the finder optical system as a whole becomes large. Therefore, the focal length $f_T$ of the objective system in the telephoto thereof and the focal length $f_{G3}$ of the third lens unit $G_3$ are preferably designed so as to satisfy the following condition (4):

$$-2.5 < f_{G_3}/f_T < -0.1 \qquad (4)$$

If the value $f_{G_3}/f_T$ exceeds the upper limit of the condition (4), the refracting power of the third lens unit $G_3$ becomes so large that aberrations occur easily in the third lens unit $G_3$. As a result, changes of aberrations will be uncontrollable when magnification is varied. If, on the other hand, the value of $f_{G3}/f_T$ falls below the lower limit of the condition (4), the refracting power of the third lens unit $G_3$ becomes so small that the total length of the objective lens system becomes long.

It is possible to make the entirety of the finder optical system small by increasing the refracting power of the second lens unit $G_2$, which is mainly used for varying magnification, to make the shifting amount of the second lens unit $G_2$ small and thus to shorten the length of a movable part of the objective system needed for the variable magnification. In this case, the focal length $f_T$ of the objective lens system in telephoto position thereof and the focal length $f_{G_2}$ of the second lens unit $G_2$ are preferably designed so as to satisfy the following condition (5):

$$0.2 < f_{G_2}/f_T < 0.41 \tag{5}$$

If the value of $f_{G_2}/f_T$ falls below the lower limit of the condition (5), the refracting power of the second lens unit $G_2$ become so large that aberrations occur easily in the second lens unit $G_2$. As a result, changes of aberrations will be uncontrollable when magnification is varied. If, on the other hand, the value of $f_{G2}/f_T$ exceeds the upper limit of the condition (5), the shifting amount of the second lens unit $G_2$ becomes large. As a result, the length of the movable part of the objective system becomes long.

Further, if at least one aspherical lens element is used in the second lens unit $G_2$, the number of lens elements which compose such a lens unit can be decreased. In this case, the focal length $f_T$ of the objective lens system in the telephoto position thereof and the focal length $f_{G2}$ of the second lens unit are preferably designed so as to satisfy the following condition (6):

$$0.15 < f_{G2}/f_T < 0.33 \tag{6}$$

Figure 5A:
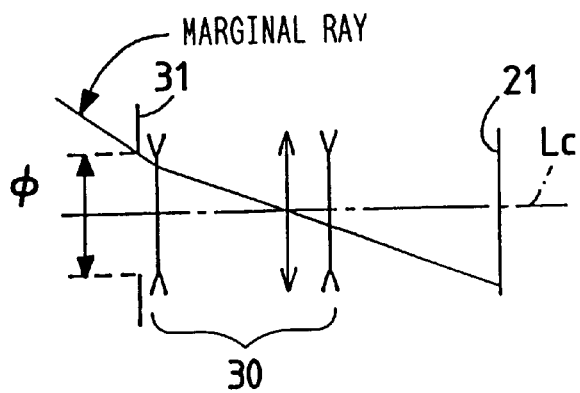
FIG. 5A and FIG. 5B are explanatory views respectively illustrating the state of an incident ray entering into the optical system in the wide and telephoto positions of the real image mode variable magnification finder optical system according to the present invention including therein a flare stop movable along the optical axis.
Figure 5B:
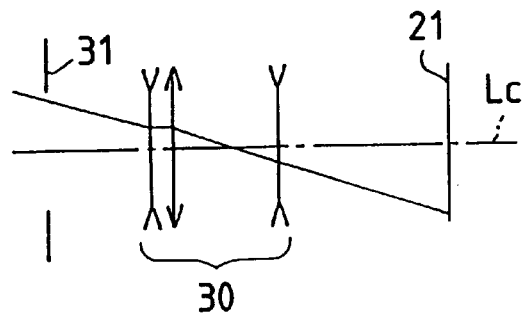

Furthermore, as shown in FIGS. 5A and 5B, if a light interrupting member 31, movable along the optic axis $L_C$, is disposed on the object side (the left side in the drawings) of an objective system 30 and is moved so as to be more distant from the objective system 30 when the objective system is adjusted to be set in the telephoto position (FIG. 5B), injurious rays which enter from outside of the visual field into the finder optical system 20 can be prevented. Moreover, as shown in FIGS. 6A and 6B, if the light interrupting member 31 is formed to have an aperture of variable size φ, adjusting the aperture to a small value of φ also allows the light interrupting member 31 to cut off injurious rays which enter from outside of the visual field into the finder optical system when the objective system is set in the telephoto position (FIG. 6B).

Figure 6A:
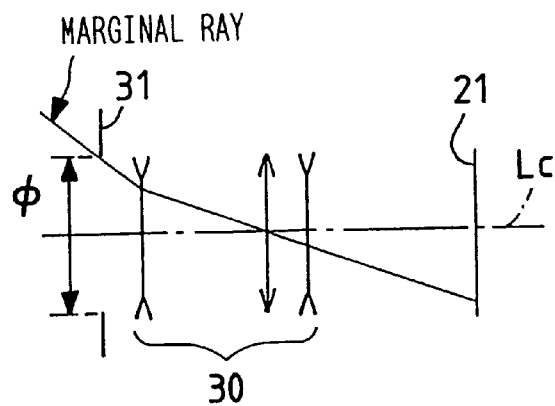
FIG. 6A and FIG. 6B are explanatory views respectively illustrating the state of an incident ray entering into the optical system in the wide and telephoto positions of the real image mode variable magnification finder optical system according to the present invention including therein a flare stop in which the aperture is variable.
Figure 6B:
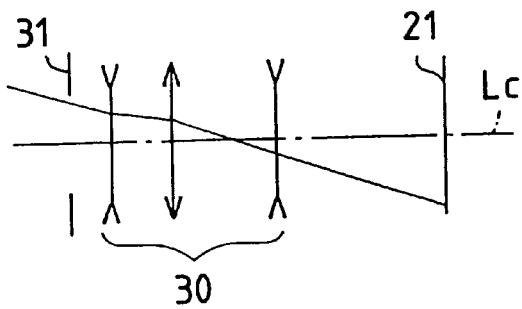

FIGS. 5A and 6A show states of the objective optical system in the wide position. In this case, it is necessary to satisfy at least one of the above-mentioned conditions (1) and (2).

Moreover, as described above, if the refracting power of the third lens unit is made large so that the objective system has a total length thereof in the telephoto position shorter than that in the wide position, the condition (1) can be satisfied. Therefore, even if the aperture of the light interrupting member has a fixed size, a high light interrupting effect is assured in the telephoto position, and cutout of incident rays can be prevented in the wide position. Accordingly, in this case, a mechanism for driving the light interrupting member is not necessary, which allows the finder optical system to be made much smaller at much lower manufacturing cost. In this case, the focal length $f_T$ of the objective system in the telephoto position and the focal length $f_{G3}$ of the third lens unit are preferably arranged so as to satisfy the following condition (7):

$$-1.0 < f_{G3}/f_T < -0.1 \tag{7}$$

As described above, according to the present invention, a real image mode variable magnification finder optical system having a high optical performance, where magnification change in a wide range is possible and where a good image of visual field with decreased flare can be obtained.

The present invention will be explained in detail below with reference to the illustrated embodiments.

First Embodiment

Figure 7A:
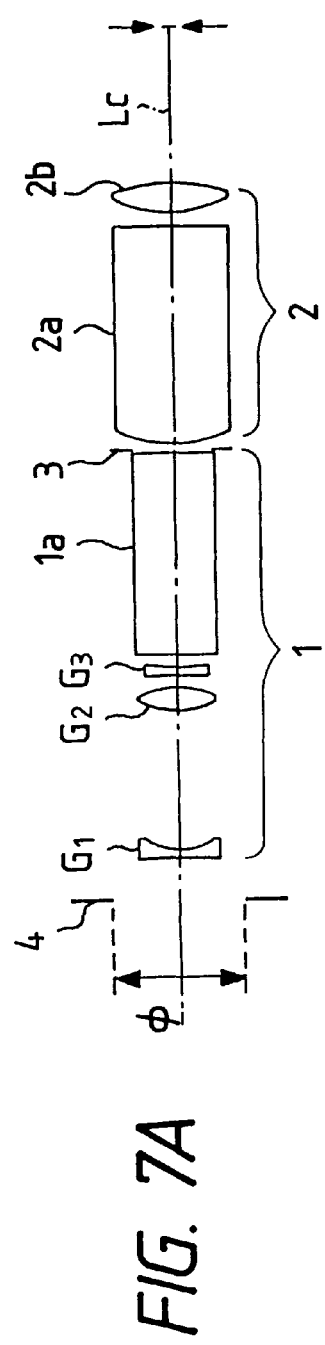
FIG. 7A, FIG. 7B and FIG. 7C show development diagrams of optical paths at a wide position, a middle position and a telephoto position of a first embodiment of the real image mode variable magnification finder optical system according to the present invention.
Figure 7B:
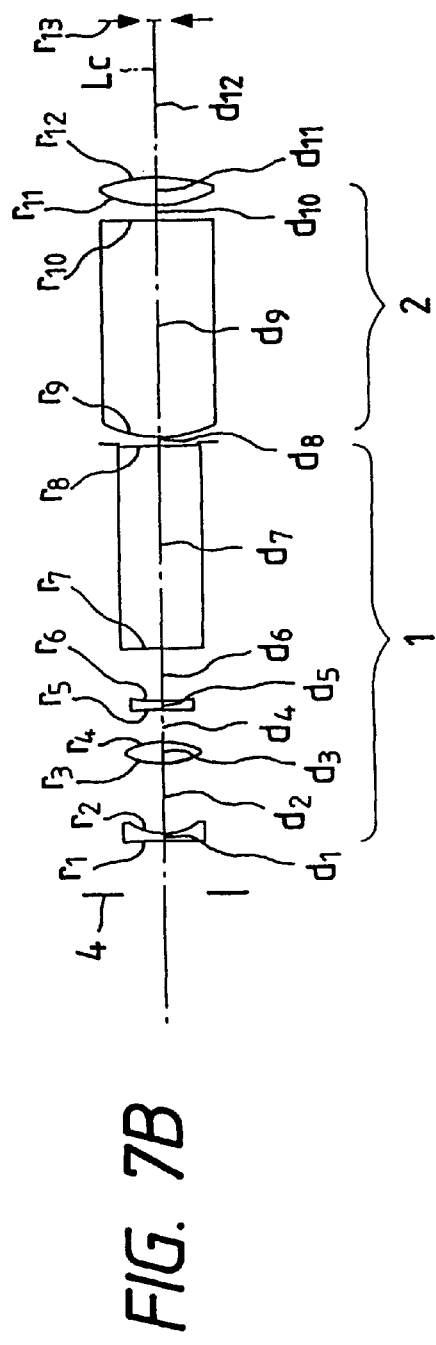
Figure 7C:
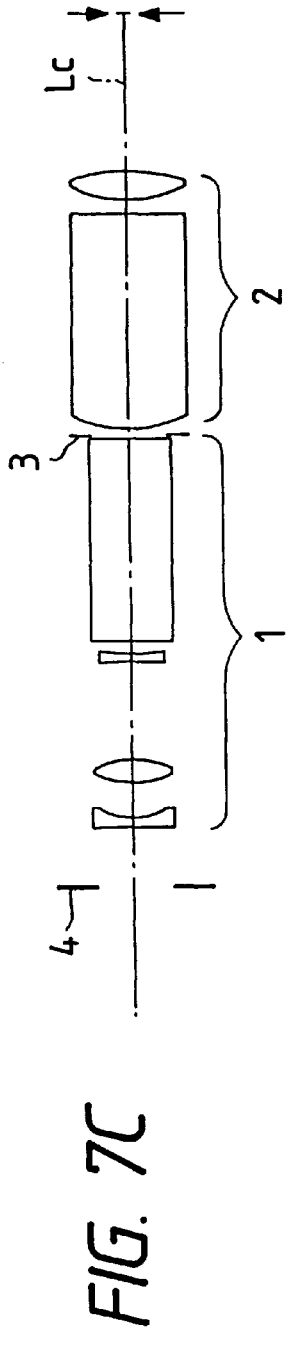

The optical system of the first embodiment, as shown in FIGS. 7A, 7B and 7C, is formed with an objective system 1 and an eyepiece system 2. The objective system 1 is composed of a first lens unit $G_1$ comprising one negative lens, a second lens unit $G_2$ comprising one positive lens, a third lens unit $G_3$ comprising one negative lens, and a prism 1a which can reflect incident rays twice. The first lens unit $G_1$, second lens unit $G_2$ and third lens unit $G_3$ are arranged so as to be able to be moved independently along the optic axis $L_c$. Further, the eyepiece system 2 is composed of a prism 2a capable of reflecting rays twice and one positive lens 2b. Between the prism 1a and the prism 2a is disposed a field frame 3.

In the optical system of the first embodiment constructed as described above, as shown in FIGS. 7A, 7B and 7C, a change of magnification is performed by moving the first lens unit $G_1$, second lens unit $G_2$ and third lens unit $G_3$ along the optic axis $L_c$, respectively. In this embodiment, an inverted image (intermediate image) formed by the first lens unit $G_1$, second lens unit $G_2$ and third lens unit $G_3$ of the objective system 1 is reflected twice by each of the prisms 1a and 2a and is converted into a correctly erect image through the positive lens 2b of the eyepiece system 2.

Further, on the object side (the left side in the drawings) of the first lens unit $G_1$ is provided a flare stop (light interrupting member) 4 capable of adjusting the size ø of aperture thereof. Whereby, the size ø of aperture of the light interrupting member 4 can be made small in the telephoto position (see FIG. 7C). As a result, injurious rays which otherwise would enter into the optical system are kept out, and a good image of visual field can be obtained.

The lens data of the first embodiment are as follows:

| Finder magnification | | |
|---|---|---|
| 0.40 times (wide) | 0.80 times (middle) | 1.20 times (telephoto) |
| Half field angle (ω) | | |
| 29.7° (wide) | 14.6° (middle) | 9.6° (telephoto) |
| Optical axial distance D between flare stop and movable lens unit on most object side | | |
| 5.0 (wide) | 6.504 (middle) | 7.352 (telephoto) |
| Size ø of aperture of flare stop | | |
| 15.4 (wide) | 10.2 (middle) | 8.8 (telephoto) |
| $r_1 = -217.7000$ | | |
| $d_1 = 1.0000$ | $n_1 = 1.58423$ | $v_1 = 30.49$ |
| $r_2 = 6.6500$ (aspherical) | | |
| $d_2 = 17.34500$ (wide) | 8.57000 (middle) | 4.48400 (telephoto) |
| $r_3 = 9.1740$ (aspherical) | | |

-continued

| | | |
|---|---|---|
| $d_3 = 2.7000$ | $n_3 = 1.49241$ | $v_3 = 57.66$ |
| $r_4 = -9.6500$ | | |
| $d_4 = 1.45500$ (wide) | 3.65700 (middle) | 11.96400 (telephoto) |
| $r_5 = 835.9850$ (aspherical) | | |
| $d_5 = 1.0000$ | $n_5 = 1.58423$ | $v_5 = 30.49$ |
| $r_6 = 21.8590$ | | |
| $d_6 = 1.50000$ (wide) | 6.56900 (middle) | 1.50000 (telephoto) |
| $r_7 = \infty$ | | |
| $d_7 = 25.000$ | $n_7 = 1.49241$ | $v_7 = 57.66$ |
| $r_8 = \infty$ | | |
| $d_8 = 1.0000$ | | |
| $r_9 = 16.5310$ | | |
| $d_9 = 26.5000$ | $n_9 = 1.52542$ | $v_9 = 55.78$ |
| $r_{10} = \infty$ | | |
| $d_{10} = 2.2500$ | | |
| $r_{11} = 17.52000$ | | |
| $d_{11} = 3.1000$ | $n_{11} = 1.49241$ | $v_{11} = 57.66$ |
| $r_{12} = 25.9220$ (aspherical) | | |
| $d_{12} = 20.0000$ | | |
| $r_{13}$ (eyepoint) | | |

Aspherical coefficients

Second surface $K = 0$    $F = -6.6157 \times 10^{-6}$
$E = -2.2121 \times 10^{-4}$
$G = 1.5806 \times 10^{-7}$ Third surface $K = 0$    $F = -2.6995 \times 10^{-6}$
$E = -4.1686 \times 10^{-4}$
$G = 6.7200 \times 10^{-8}$ Fifth surface $K = 0$    $F = 1.2108 \times 10^{-5}$
$E = -3.6135 \times 10^{-4}$
$G = -7.5700 \times 10^{-7}$ Twelfth surface $K = 0$    $F = 3.4507 \times 10^{-7}$
$E = 7.6136 \times 10^{-5}$
$G = -4.6801 \times 10^{-9}$ In the real image mode variable magnification optical system according to the first embodiment, values of ratios $D_3/L$, $f_{G3}/f_T$ and $f_{G2}/f_T$ are as follows:

$D_3/L = 3.04$ $f_{G3}/f_T = -1.5$ $f_{G2}/f_T = 0.400$

These values satisfy all the above-mentioned conditions (3) to (5). Further, as is apparent from the above numerical data, the conditions (1) and (2) are, of course, satisfied.

Figure 8A:
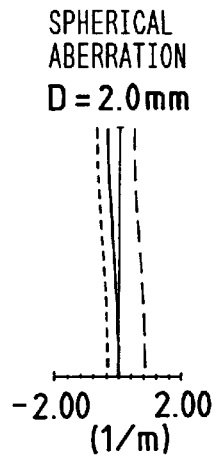
FIG. 8A, FIG. 8B and FIG. 8C are graphs respectively showing characteristics of spherical aberration, astigmatism and distortion at the wide position in the optical system of the first embodiment.
Figure 8B:
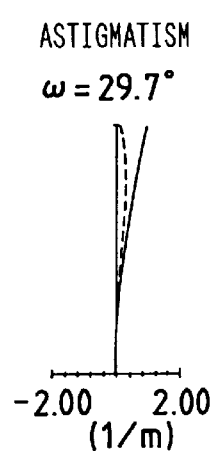
Figure 8C:
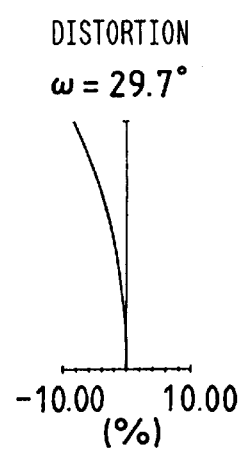
Figure 9A:
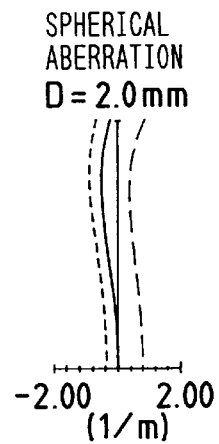
FIG. 9A, FIG. 9B and FIG. 9C are diagrams respectively showing characteristics of spherical aberration, astigmatism and distortion at the middle position in the optical system of the first embodiment.
Figure 9B:
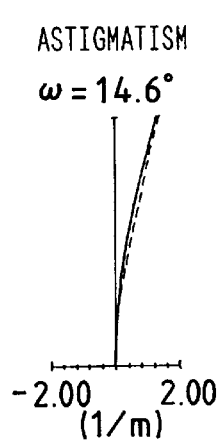
Figure 9C:
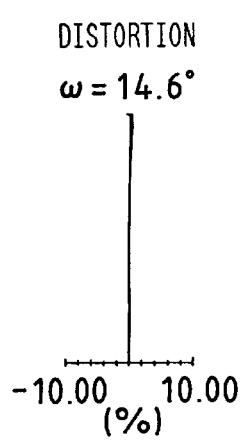
Figure 10A:
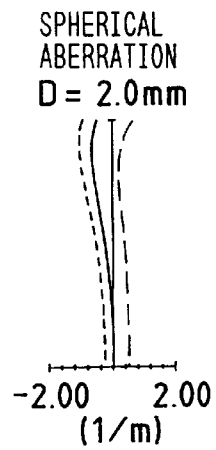
FIG. 10A, FIG. 10B and FIG. 10C are diagrams respectively showing characteristics of spherical aberration, astigmatism and distortion at the telephoto position in the optical system of the first embodiment.
Figure 10B:
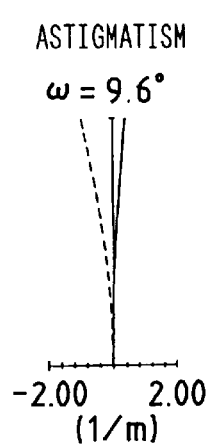
Figure 10C:
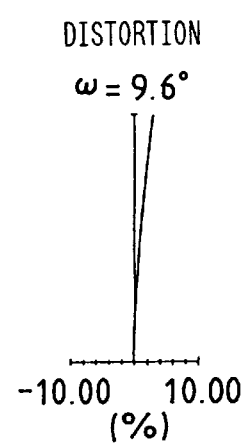

FIGS. 8A–8C, 9A–9C and 10A–10C show the characteristics of aberrations of the real image mode variable magnification finder optical system according to the first embodiment. Particularly, FIGS. 8A, 8B and 8C show aberrations at the wide position, FIGS. 9A, 9B and 9C show aberrations at the middle position and FIGS. 10A, 10B and 10C show aberrations at the telephoto position, respectively.

Second Embodiment

The optical system according to the second embodiment, as shown in FIGS. 11A, 11B and 11C, is composed of an objective system 5 and an eyepiece system 6. The objective system 5 is constructed by a first lens unit $G_1$ comprising two negative lenses, a second lens unit $G_2$ comprising one positive lens, a third lens unit $G_3$ comprising one negative lens and a prism 6a which can reflect incident rays three times. The first lens unit $G_1$, second lens unit $G_2$ and third lens unit $G_3$ are arranged so as to be able to be moved independently along the optic axis $L_c$. Further, the eyepiece system 6 is composed of a prism 6a capable of reflecting rays once and one positive lens 6b. Between the prism 5a and the prism 6a is arranged the field frame 3.

In the optical system according to the second embodiment constructed as described above, a change of magnification is performed by moving the first lens unit $G_1$, second lens unit $G_2$ and third lens unit $G_3$ along the optic axis $L_c$, respectively. In this optical system, an inverted image formed by the first lens unit $G_1$, second lens unit $G_2$ and third lens unit $G_3$ is reflected three times by the prism 5a and further reflected once by the prism 6a, and is converted into a correctly erect image through the positive lens 6b of the eyepiece system 6.

Also, in this optical system, on the object side (the left side in the drawings) of the first lens unit $G_1$ is provided a flare stop 11, as in the optical system shown in the first embodiment. In this optical system, as shown in FIGS. 11A and 11C, the total length of the objective system 5 at the telephoto position becomes shorter than that at the wide position. Accordingly, injurious rays which otherwise would enter into the optical system can be effectively cut off because the distance between the flare stop 11 and the first lens unit $G_1$ is increased when the optical system is adjusted to the telephoto position, even if the flare stop 11 is kept at a fixed position.

Numerical data of lenses of the real image mode variable magnification finder optical system according to the second embodiment are as follows:

Finder magnification 0.45 times (wide)    0.90 times (middle)    1.80 times (telephoto)

Half field angle ($\omega$)

28.1° (wide)    13.7° (middle)    6.7° (telephoto)

Optical axial distance D between flare stop and movable lens unit on most object side 0 (wide)    2.44 (middle)    6.79 (telephoto)

Size $\phi$ of aperture of flare stop 13.3 (wide)    13.3 (middle)    13.3 (telephoto)

| | | |
|---|---|---|
| $r_1 = 11.8270$ | | |
| $d_1 = 1.0000$ | $n_1 = 1.58423$ | $v_1 = 30.49$ |
| $r_2 = 6.7250$ (aspherical) | | |
| $d_2 = 3.3000$ | | |
| $r_3 = 40.2590$ | | |
| $d_3 = 1.2000$ | $n_3 = 1.58423$ | $v_3 = 30.49$ |
| $r_4 = 12.5290$ (aspherical) | | |
| $d_4 = 21.62000$ (wide) | 10.06000 (middle) | 1.00000 (telephoto) |
| $r_5 = 10.2850$ (aspherical) | | |
| $d_5 = 4.0000$ | $n_5 = 1.49241$ | $v_5 = 57.66$ |
| $r_6 = -9.6750$ | | |
| $d_6 = 1.00000$ (wide) | 1.49000 (middle) | 12.26000 (telephoto) |
| $r_7 = -174.8950$ (aspherical) | | |
| $d_7 = 1.0000$ | $n_7 = 1.58423$ | $v_7 = 30.49$ |
| $r_8 = 18.9000$ | | |
| $d_8 = 1.89000$ (wide) | 10.52000 (middle) | 4.46000 (telephoto) |
| $r_9 = \infty$ | | |
| $d_9 = 28.0000$ | $n_9 = 1.49241$ | $v_9 = 57.66$ |
| $r_{10} = \infty$ | | |
| $d_{10} = 1.0000$ | | |
| $r_{11} = = 19.0000$ | | |
| $d_{11} = 20.0000$ | $n_{11} = 1.49241$ | $v_{11} = 57.66$ |
| $r_{12} = \infty$ | | |
| $d_{12} = 6.2000$ | | |
| $r_{13} = 17.5000$ | | |
| $d_{13} = 3.1000$ | $n_{13} = 1.49241$ | $v_{13} = 57.66$ |

-continued $r_{14} = -25.9000$ (aspherical)
$d_{14} = 20.0000$
$r_{15}$ (eyepoint)
Aspherical coefficients Second surface

| | |
|---|---|
| $K = 0$ | $F = -1.1859 \times 10^{-6}$ |
| $E = 3.2874 \times 10^{-4}$ | |
| $G = 4.7707 \times 10^{-7}$ | |

Fourth surface

| | |
|---|---|
| $K = 0$ | $F = 4.4640 \times 10^{-6}$ |
| $E = -5.2663 \times 10^{-4}$ | |
| $G = -2.8524 \times 10^{-7}$ | |

Fifth surface

| | |
|---|---|
| $K = 0$ | $F = 2.7284 \times 10^{-6}$ |
| $E = -4.6494 \times 10^{-4}$ | |
| $G = -1.0533 \times 10^{-7}$ | |

Seventh surface

| | |
|---|---|
| $K = 0$ | $F = -5.4740 \times 10^{-6}$ |
| $E = E\ -7.6338 \times 10^{-5}$ | |
| $G = G\ 2.0688 \times 10^{-7}$ | |

Fourteenth surface

| | |
|---|---|
| $K = 0$ | $F = -2.5300 \times 10^{-7}$ |
| $E = 7.4132 \times 10^{-5}$ | |
| $G = 2.5960 \times 10^{-9}$ | |

Further, in the real image mode variable magnification finder optical system according to the second embodiment, values of ratios $D_3/L$, $f_{G3}/f_T$ and $f_{G2}/f_T$ are as follows $$D_3/L = 3.25$$

$$f_{G3}/f_T = -0.8$$

$$f_{G2}/f_T = 0.286$$

These values satisfy all of the above-mentioned conditions (3) through (5). Furthermore, as is apparent from the above numerical data, the condition (1) is, of course, satisfied.

Figure 12A:
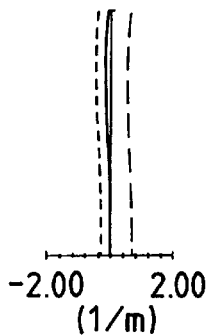
FIG. 12A, FIG. 12B and FIG. 12C are diagrams respectively showing characteristics of spherical aberration, astigmatism and distortion at the wide position in the optical system of the second embodiment.
Figure 12B:
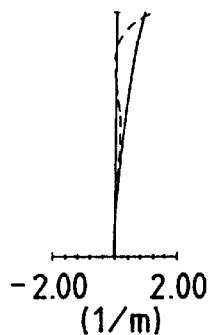
Figure 12C:
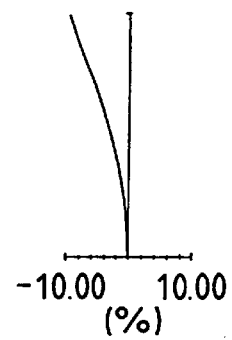
Figure 13A:
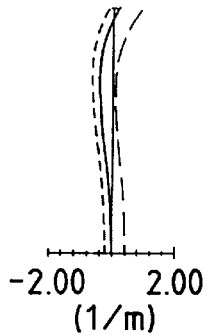
FIG. 13A, FIG. 13B and FIG. 13C are diagrams respectively showing characteristics of spherical aberration, astigmatism and distortion at the intermediate position in the optical system of the second embodiment.
Figure 13B:
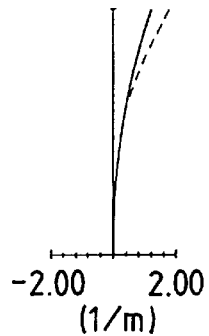
Figure 13C:
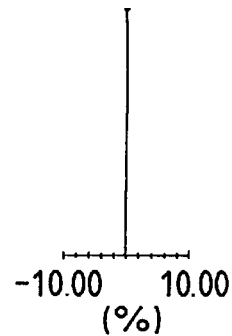
Figure 14A:
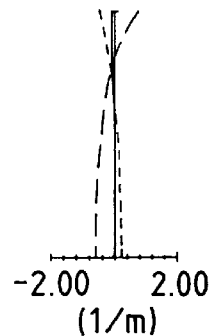
FIG. 14A, FIG. 14B and FIG. 14C are diagrams respectively showing characteristics of spherical aberration, astigmatism and distortion at the telephoto position in the optical system of the second embodiment.
Figure 14B:
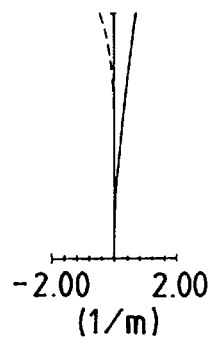
Figure 14C:
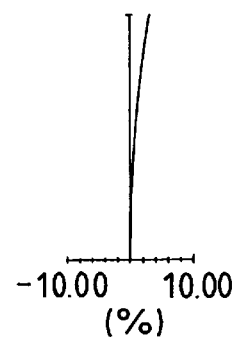

Also, FIGS. 12A–12C, 13A–13C and 14A–14C show the characteristics of aberrations of the real image mode variable magnification finder optical system according to the second embodiment. Particularly, FIGS. 12A, 12B and 12C show aberrations at the wide position, FIGS. 13A, 13B and 13C show aberrations at the middle position, and FIGS. 14A, 14B and 14C show aberrations at the telephoto position.

Third Embodiment

The optical system according to the third embodiment, as shown in FIGS. 15A–15C, is composed of an objective system 7 and an eyepiece system 8. The objective system 7 is constructed by a first lens unit $G_0$ consisting of a single lens with a small refracting power, a second lens unit $G_1$ consisting of one negative lens, a third lens unit $G_2$ consisting of one positive lens, a fourth lens unit $G_3$ consisting of one negative lens and a prism 7a which can reflect incident rays twice. Further, the second lens unit $G_1$, third lens unit $G_2$ and fourth lens unit $G_3$ are arranged so as to be moved independently along the optic axis $L_c$. The eyepiece system 8 is composed of a prism 8a capable of reflecting rays twice and one positive lens 8b. Further, the field frame 3 is arranged between the prisms 7a and 8a.

In the optical system according to the third embodiment constructed as described above, a change of magnification is performed by moving the second lens unit $G_1$, third lens unit $G_2$ and fourth lens unit $G_3$ along the optic axis $L_c$, respectively. The first lens unit $G_0$ is kept in a stationary state when magnification is being varied. However, a change of diopter caused by a change of distance between the optical system and an object to be photographed can be corrected by moving the first lens unit $G_1$ along the optic axis $L_c$ in accordance with the change thereof. Further, in this optical system, an inverted image of the object formed by the first lens unit $G_0$, second lens unit $G_1$, third lens unit $G_2$ and fourth lens unit $G_3$ is reflected twice by each of the prisms 7a and 8a and is converted into a correctly erect image through the positive lens 8a of the eyepiece system 8.

Also, in this optical system, the stationary, flare stop 11 is provided on the eyepiece system side of the first lens unit $G_0$. In this optical system, as shown in FIGS. 15A and 15C, the total length of the objective system 7 at the telephoto position becomes shorter than that at the wide position. Therefore, injurious rays which otherwise would enter into the optical system can be effectively cut off because the distance between the flare stop 11 and the second lens unit $G_1$ is increased when the optical system is set in the telephoto position, even if the flare stop is kept at a fixed position.

Numerical data of lenses of the real image mode variable magnification finder optical system according to the third embodiment are as follows:

Finder magnification

| | | |
|---|---|---|
| 0.45 times (wide) | 0.90 times (middle) | 1.80 times (telephoto) |

Half field angle (ω)

| | | |
|---|---|---|
| 27.4° (wide) | 13.2° (middle) | 6.5° (telephoto) |

Optical axial distance D between flare stop and movable lens unit for magnification change arranged on most object side

| | | |
|---|---|---|
| 0.69 (wide) | 2.89 (middle) | 3.07 (telephoto) |

Size ø of aperture of flare stop

| | | |
|---|---|---|
| 9.2 (wide) | 9.2 (middle) | 9.2 (telephoto) |
| $r_1 = 8.0700$ | | |
| $d_1 = 1.0000$ | $n_1 = 1.58423$ | $\nu_1 = 30.49$ |
| $r_2 = 6.2250$ | | |
| $d_2 = 3.99000$ (wide) | 6.19000 (middle) | 6.37000 (telephoto) |
| $r_3 = -26.3100$ | | |
| $d_3\ 32\ 1.2000$ | $n_3 = 1.58423$ | $\nu_3 = 30.49$ |
| $r_4 = 19.5200$ (aspherical) | | |
| $d_4 = 18.96000$ (wide) | 8.17000 (middle) | 1.00000 (telephoto) |
| $r_5 = 9.5180$ (aspherical) | | |
| $d_5 = 2.9100$ | $n_5 = 1.52540$ | $\nu_5 = 56.25$ |
| $r_6 = 10.6510$ | | |
| $d_6 = 1.00000$ (wide) | 1.68000 (middle) | 9.81000 (telephoto) |
| $r_7 = 84.4050$ (aspherical) | | |
| $d_7 = 1.0000$ | $n_7 = 1.58423$ | $\nu_7 = 30.49$ |
| $r_8 = 14.0220$ | | |
| $d_8 = 1.94000$ (wide) | 9.85000 (middle) | 8.72000 (telephoto) |
| $r_9 = \infty$ | | |
| $d_9 = 25.2800$ | $n_9 = 1.49241$ | $\nu_9 = 57.66$ |
| $r_{10} = \infty$ | | |
| $d_{10} = 1.0000$ | | |
| $r_{11} = 18.2370$ | | |
| $d_{11} = 26.5000$ | $n_{11} = 1.52540$ | $\nu_{11} = 56.25$ |
| $r_{12} = \infty$ | | |
| $d_{12} = 2.2500$ | | |
| $r_{13} = 15.5820$ | | |
| $d_{13} = 3.7900$ | $n_{13}\ 1.49241$ | $\nu_{13} = 57.66$ |
| $r_{14} = -31.5370$ (aspherical) | | |
| $d_{14} = 20.0000$ | | |
| $r_{15}$ (eyepoint) | | |

Aspherical coefficients

-continued

Fourth surface

K = 0  F = −4.2007 × 10⁻⁶
E = −1.2900 × 10⁻⁴
G = −4.7480 × 10⁻⁸
Fifth surface

K = 0  F = 2.4458 × 10⁻⁶
E = −4.4328 × 10⁻⁴
G = −4.1813 × 10⁻⁸
Seventh surface

K = 0  F = −8.5261 × 0⁻⁷
E = −1.6696 × 10⁻⁴
G = −6.2654 × 10⁻⁸
Seventh surface

K = 0  F = −9.7566 × 10⁻⁸
E = 8.0013 × 10⁻⁵
G = 4.7291 × 10⁻¹⁰

Further, in the real image mode variable magnification finder optical system according to the third embodiment, values of ratios $D_3/L$, $f_{G3}/f_T$ and $f_{G2}/f_T$ are as follows:

$D_3/L = 3.02$ $f_{G3}/f_T = -0.8$ $f_{G2}/f_T = 0.267$

These values satisfy all the above-mentioned conditions (3) through (5). Also, as is apparent from the above numerical data, the condition (1) is, of course, satisfied.

Figure 16A:
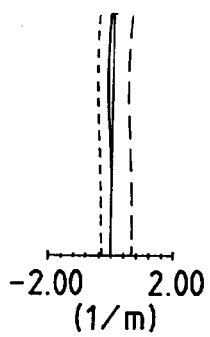
FIG. 16A, FIG. 16B and FIG. 16C are graphs respectively showing characteristics of spherical aberration, astigmatism and distortion at the wide position in the optical system of the third embodiment.
Figure 16B:
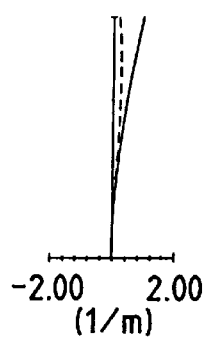
Figure 16C:
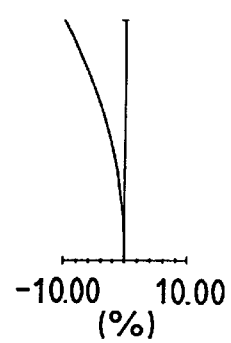
Figure 17A:
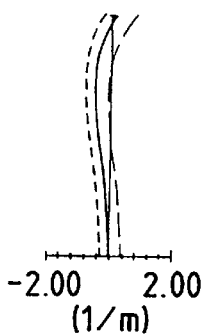
FIG. 17A, FIG. 17B and FIG. 17C are diagrams respectively showing characteristics of spherical aberration, astigmatism and distortion at the middle position in the optical system of the third embodiment.
Figure 17B:
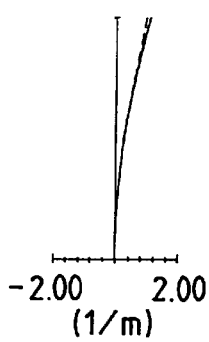
Figure 17C:
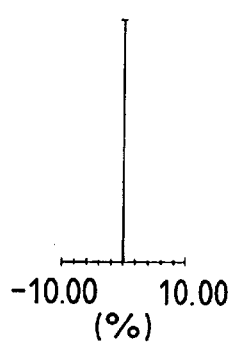
Figure 18A:
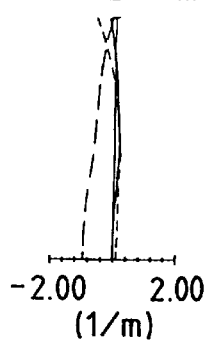
FIG. 18A, FIG. 18B and FIG. 18C are diagrams respectively showing characteristics spherical aberration, astigmatism and distortion at the telephoto position in the optical system of the third embodiment.
Figure 18B:
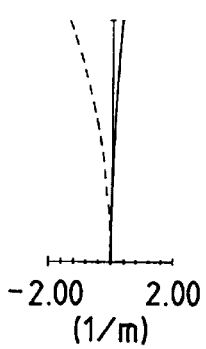
Figure 18C:
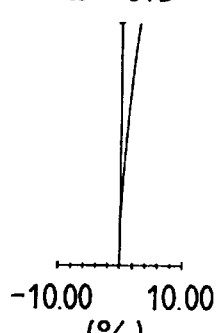

FIGS. 16A–16C, 17A–17C and 18A–18C show the characteristics of aberrations of the real image mode variable magnification finder optical system according to the third embodiment. Particularly, FIGS. 16A, 16B and 16C show aberrations at the wide position, FIG. 17A, 17B and 17C show aberrations at the middle position, and FIGS. 18A, 18B and 18C show aberrations at the telephoto position, respectively.

Fourth Embodiment

Figure 19A:
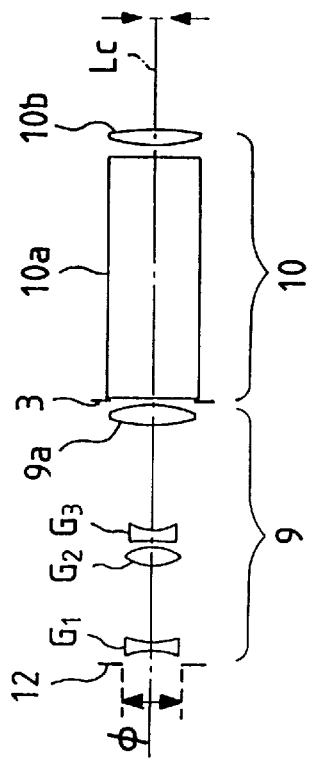
FIG. 19A, FIG. 19B and FIG. 19C show development diagrams of optical paths at a wide position, a middle position and a telephoto position of a fourth embodiment of the real image mode variable finder optical system according to the present invention.
Figure 19B:
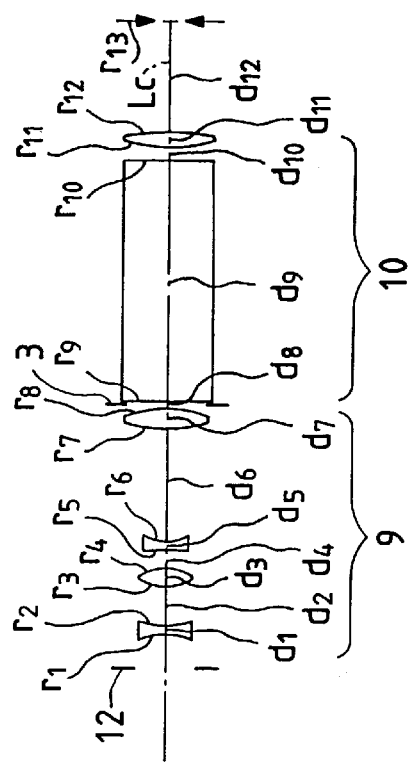
Figure 19C:
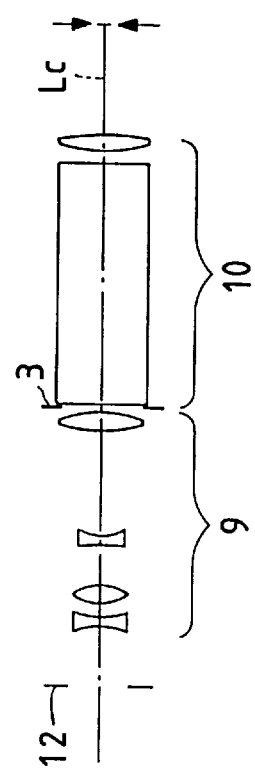

The optical system according to the fourth embodiment, as shown in FIGS. 19A, 19B and 19C, is composed of an objective system 9 and an eyepiece system 10. The objective system 9 is constructed by a first lens unit $G_1$ consisting of one negative lens, a second lens unit $G_2$ consisting of one positive lens, a third lens unit $G_3$ consisting of one negative lens, a Dach mirror not shown which can reflect incident rays twice and a field lens 9a. Further, the first lens unit $G_1$, second lens unit $G_2$ and third lens unit $G_3$ are arranged so as to be moved independently along the optic axis $L_c$. The eyepiece system 10 is composed of a penta prism 10a capable of reflecting rays twice and one positive lens 10b. Further, the field frame 3 is arranged between the field lens 9a and the positive lens 10b.

In the optical system according to the fourth embodiment constructed as described above, a change of magnification is performed by moving the first lens unit $G_1$, second lens unit $G_2$ and third lens unit $G_3$ along the optic axis $L_c$, respectively. Also, in this optical system, an inverted image of the object formed by the first lens unit $G_1$, second lens unit $G_2$ and third lens unit $G_3$ is reflected twice by the Dach prism and the penta prism 10a and is converted into a correctly erect image through the positive lens 10b of the eyepiece system 10.

Further, in this optical system, on the object side (the left side in the drawings) of the first lens unit $G_1$ is provided a flare stop 12 movable along the optic axis $L_c$. This flare stop 12 is so arranged as to move to the object side when the optical system is set in the telephoto position.

As described above, in this optical system, cutting off incident rays can be prevented in the wide position, and entering of injurious rays into the optical system can be prevented in the telephoto position, by moving the flare stop 12 along the optic axis $L_c$, even if the flare stop with a constant size ⌀ of aperture is used.

Numerical data of lenses of the real image mode variable magnification finder optical system according to the fourth embodiment are as follows:

Finder magnification 0.35 times (wide),   0.60 times (middle)   1.05 times (telephoto)

Half field angle (ω)

30.1° (wide)   16.3° (middle)   9.1° (telephoto)

Optical axial distance D between flare stop and movable lens unit on the most object side 2.0 (wide)   4.7 (middle)   9.7 (telephoto)

Size ⌀ of aperture of flare stop 7.5 (wide)   7.5 (middle)   7.5 (telephoto)

$r_1 = -7.8091$
$d_1 = 1.2000$   $n_1 = 1.58423$   $v_1 = 30.49$
$r_2 = 7.7971$ (aspherical)
$d_2 = 10.1000$ (wide)   5.17518 (middle)   1.73519 (telephoto)
$r_3 = 4.4750$ (aspherical)
$d_3 = 2.5000$   $n_3 = 1.49241$   $v_3 = 57.66$
$r_4 = -4.9908$ (aspherical)
$d_4 = 1.00000$ (wide)   2.33955 (middle)   5.36481 (telephoto)
$r_5 = -39.9198$
$d_5 = 1.2000$   $n_5 = 1.58423$   $v_5 = 30.49$
$r_6 = 4.3385$ (aspherical)
$d_6 = 14.00000$ (wide)   15.00000 (middle)   14.00000 (telephoto)
$r_7 = 13.1734$ (aspherical)
$d_7 = 2.8000$   $n_7 = 1.49241$   $v_7 = 57.66$
$r_8 = -12.8551$
$d_8 = 1.0000$
$r_9 = \infty$
$d_1 = 32.5000$   $n_9 = 1.49241$   $v_9 = 57.66$
$r_{10} = \infty$
$d_{10} = 1.5000$
$r_{11} = 17.2118$ (aspherical)
$d_1 = 2.0040$   $n_{11} = 1.49241$   $v_{11} = 57.66$
$r_{12} = -36.2621$
$d_1 = 15.0000$
$r_{13\ (eyepoint)}$ Aspherical coefficients Second surface K = 0  F = 3.3521 × 10⁻⁵
E = −1.3843 × 10⁻³
G = 3.3080 × 10⁻⁶
Third surface K = 0  F = −6.9924 × 10⁻⁵
E = −2.4248 × 10⁻³
G = −3.3791 × 10⁻⁶
Fourth surface K = 0  F = −1.0305 × 10⁻⁴
E = 2.7366 × 10⁻³
G = 1.5308 × 10⁻⁶
Sixth surface K = 0  F = 4.2995 × 10⁻⁴
E = −1.7843 × 10⁻³
G = −5.0842 × 10⁻⁵
Seventh surface

K = 0  F = 4.8665 × 10⁻⁵

-continued

E = −1.1077 × 10⁻³
G = −8.9924 × 10⁻⁷
Eleventh surface

K = 0                F = 3.3791 × 10⁻⁶
E = −9.0149 × 10⁻⁵
G = −7.6166 × 10⁻⁸

Further, in the real image mode variable magnification finder optical system according to the fourth embodiment, values of ratios $D_3/L$, $f_{G3}/f_T$ and $f_{G2}/f_T$ are as follows:

$$D_3/L=2.12$$

$$f_{G3}/f_T=-0.3$$

$$f_{G2}/f_T=0.208$$

These values satisfy all the above-mentioned conditions (3) through (5). Also, as is apparent from the above numerical data, the condition (1) is, of course, satisfied.

Figure 20A:
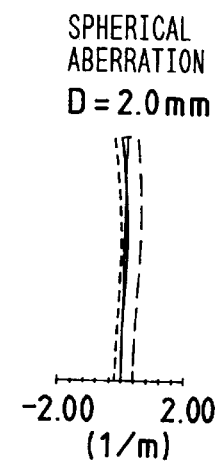
FIG. 20A, FIG. 20B and FIG. 20C are diagrams respectively showing characteristics of spherical aberration, astigmatism and distortion at the wide position in the optical system of the fourth embodiment.
Figure 20B:
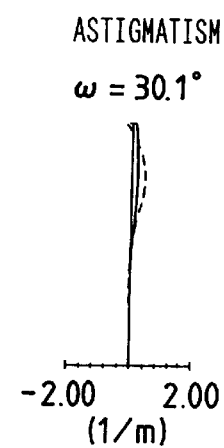
Figure 20C:
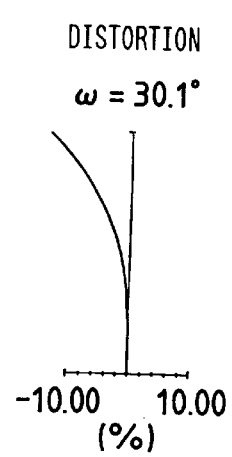
Figure 21A:
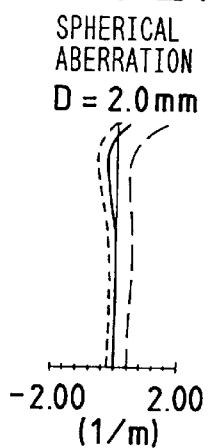
FIG. 21A, FIG. 21B and FIG. 21C are diagrams respectively showing characteristics of spherical aberration, astigmatism and distortion at the middle position in the optical system of the fourth embodiment.
Figure 21B:
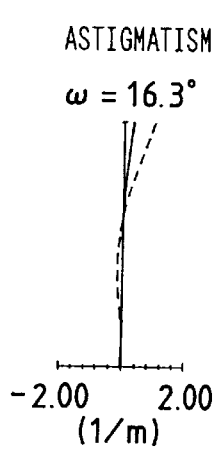
Figure 21C:
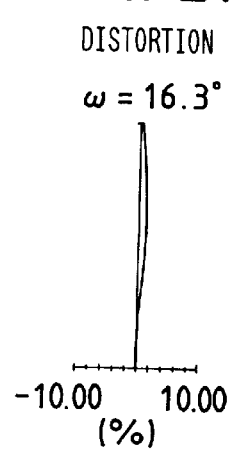
Figure 22A:
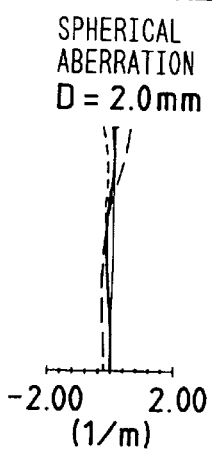
FIG. 22A, FIG. 22B and FIG. 22C are diagrams respectively showing characteristics of spherical aberration, astigmatism and distortion at the telephoto position in the optical system of the fourth embodiment.
Figure 22B:
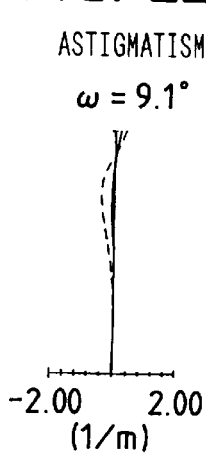
Figure 22C:
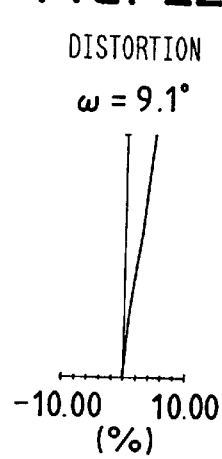

FIGS. 20A–20C, 21A–21C and 22A–22C show the characteristics of aberrations of the real image mode variable magnification finder optical system according to the fourth embodiment. Particularly, FIGS. 20A, 20B and 20C show aberrations at the wide position, FIGS. 21A, 21B and 21C show aberrations at the middle position, and FIGS. 22A, 22B and 22C show aberrations at the telephoto position, respectively.

In each embodiment mentioned above, $r_1, r_2, \ldots$ represent radii of curvature of individual lens surfaces; $d_1, d_2, \ldots$ thickness of individual lenses or spaces therebetween; $n_1, n_2 \ldots$ refractive indices of individual lenses; and $v_1, v_2, \ldots$ Abbe's numbers of individual lenses.

Also, the configurations of aspherical surfaces in each embodiment are expressed by the following equation using the aspherical coefficients:

$$Z = \frac{CY^2}{1+\sqrt{1-(K+1)C^2Y^2}} + EY^4 + FY^6 + GY^8$$

where Z represents the coordinates in the direction of the optical axis, Y the coordinates in the direction normal to the optical axis, C the curvature (=1/r) at the vertex of the spherical surface, K the conic constant, and E, F and G the aspherical coefficients of fourth, sixth and eighth orders.

Other embodiments and variations will occur to those of ordinary skill in the art but those are intended to be covered by the following claims.

What is claimed is:

1. A real image mode variable magnification finder optical system comprising, in order from an object side:
    an objective system having a positive refracting power;
    a correctly erect image forming system having a plurality of reflecting members, said correctly erect image forming system converting an intermediate image formed by said objective system into a correctly erect image; and
    an eyepiece system having a positive refracting power,
    wherein said objective system includes movable lens units moving in accordance with magnification change from a wide position through a telephoto position, and
    a light interrupting member is disposed on an object side of a most object-side movable lens unit of said objective system at a fixed position during the magnification change, said most object-side movable lens unit being moved in a range of positions closest to an object during the magnification change, with a following condition being satisfied:

$$D_T>D_W$$

where $D_T$ is a distance between said light interrupting member and said most object-side movable lens unit when the finder optical system is adjusted to the telephoto position, and $D_W$ is a distance between said light interrupting member and said most object-side movable lens unit when the finder optical system is adjusted to the wide position.

2. A real image mode variable magnification finder optical system according to claim 1, wherein a field frame is disposed on an intermediate image plane and the following condition is satisfied:

$$1.4<D_3/L$$

where $D_3$ is a minimum value of a space between a most image-side movable lens unit of said objective system and the intermediate image plane, and L is a diagonal length of said field frame.

3. A real image mode variable magnification optical system comprising, in order from an object side:
    an objective system having a positive refracting power;
    a correctly erect image forming system having a plurality of reflecting members, said correctly erect image forming system converting an intermediate image formed by said objective system into a correctly erect image; and
    an eyepiece system having a positive refracting power,
    wherein said objective system includes movable lens units moving in accordance with magnification change from a wide position through a telephoto position, and
    a light interrupting member is disposed on an object side of a most object-side movable lens unit of said objective system and satisfies a following condition:

$$\phi_W>\phi_T$$

where $\phi_W$ is a size of an aperture of said light interrupting member when the finder optical system is adjusted to the wide position, and $\phi_T$ is a size of said aperture of said light interrupting member when the finder optical system is adjusted to the telephoto position.

4. A real image mode variable magnification finder optical system according to claim 3, wherein a field frame is disposed on an intermediate image plane and the following condition is satisfied:

$$1.4<D_3/L$$

where $D_3$ is a minimum value of a space between a most image-side movable lens unit of said objective system and the intermediate image plane, and L is a diagonal length of said field frame.

5. A real image mode variable magnification finder optical system according to claim 3, wherein the following condition is further satisfied:

$$D_T>D_W$$

where $D_T$ is a distance between said light interrupting member and said most object-side movable lens unit when the finder optical system is adjusted to the telephoto position, and $D_W$ is a distance between said light interrupting member and said most object-side movable lens unit when the finder optical system is adjusted to the wide position.

* * * * *